Dec. 4, 1945.   E. S. TASCHER   2,390,195
FLOUR DUSTER
Filed Feb. 14, 1944   4 Sheets-Sheet 4
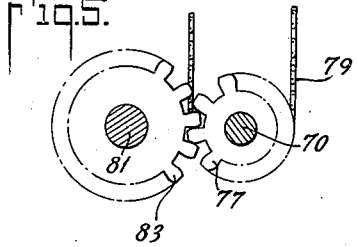
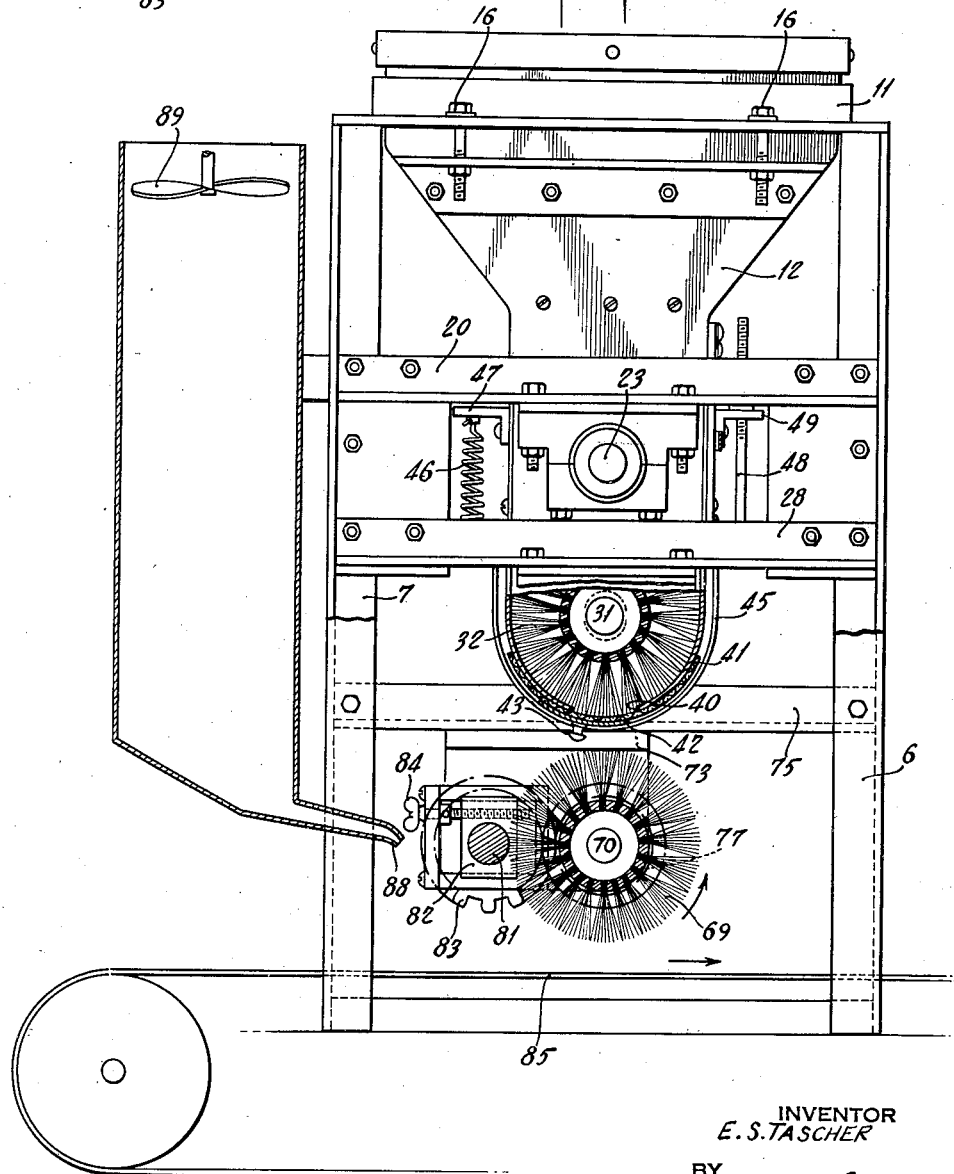
INVENTOR
E. S. TASCHER
BY Henry J. Savage
ATTORNEY Patented Dec. 4, 1945

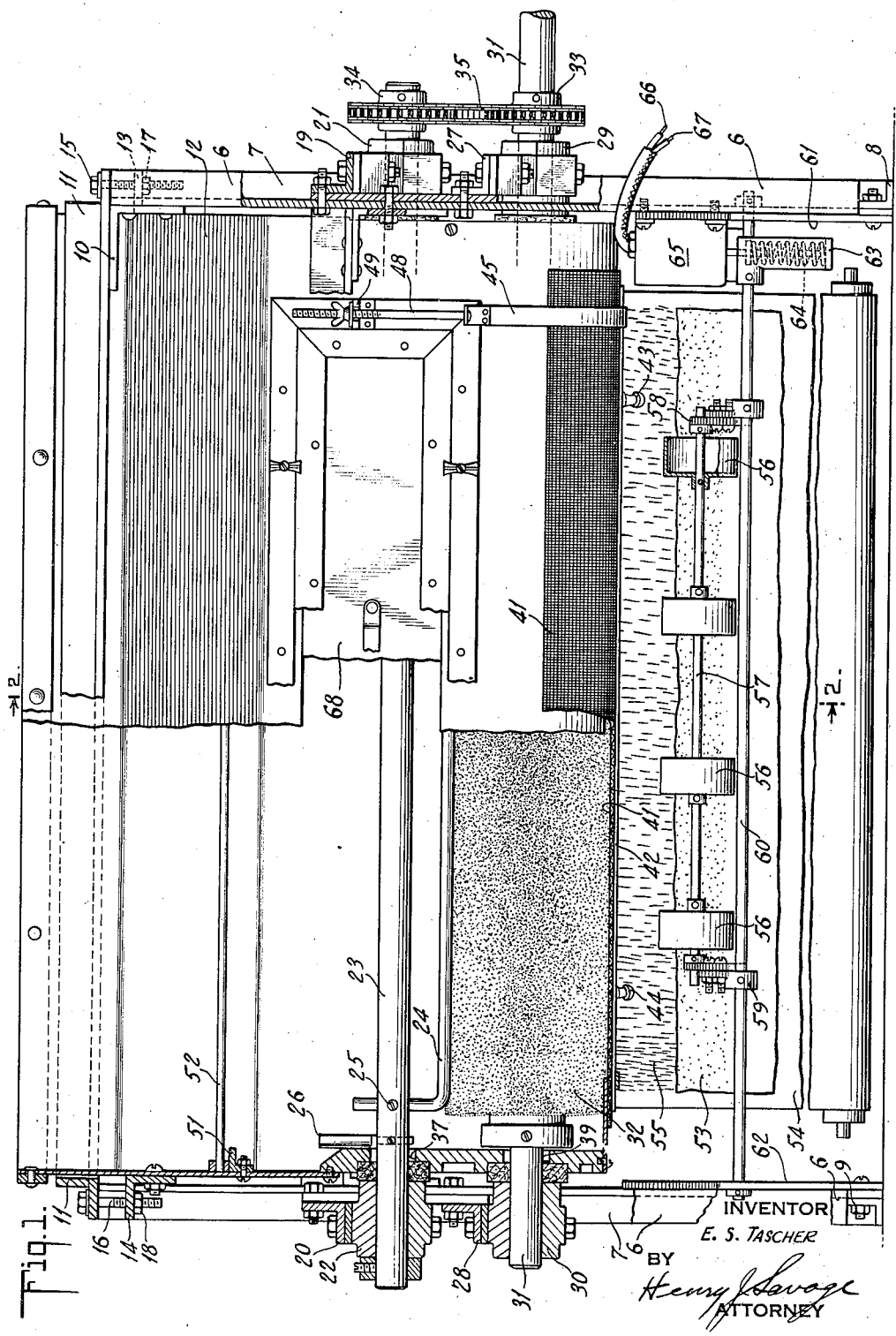

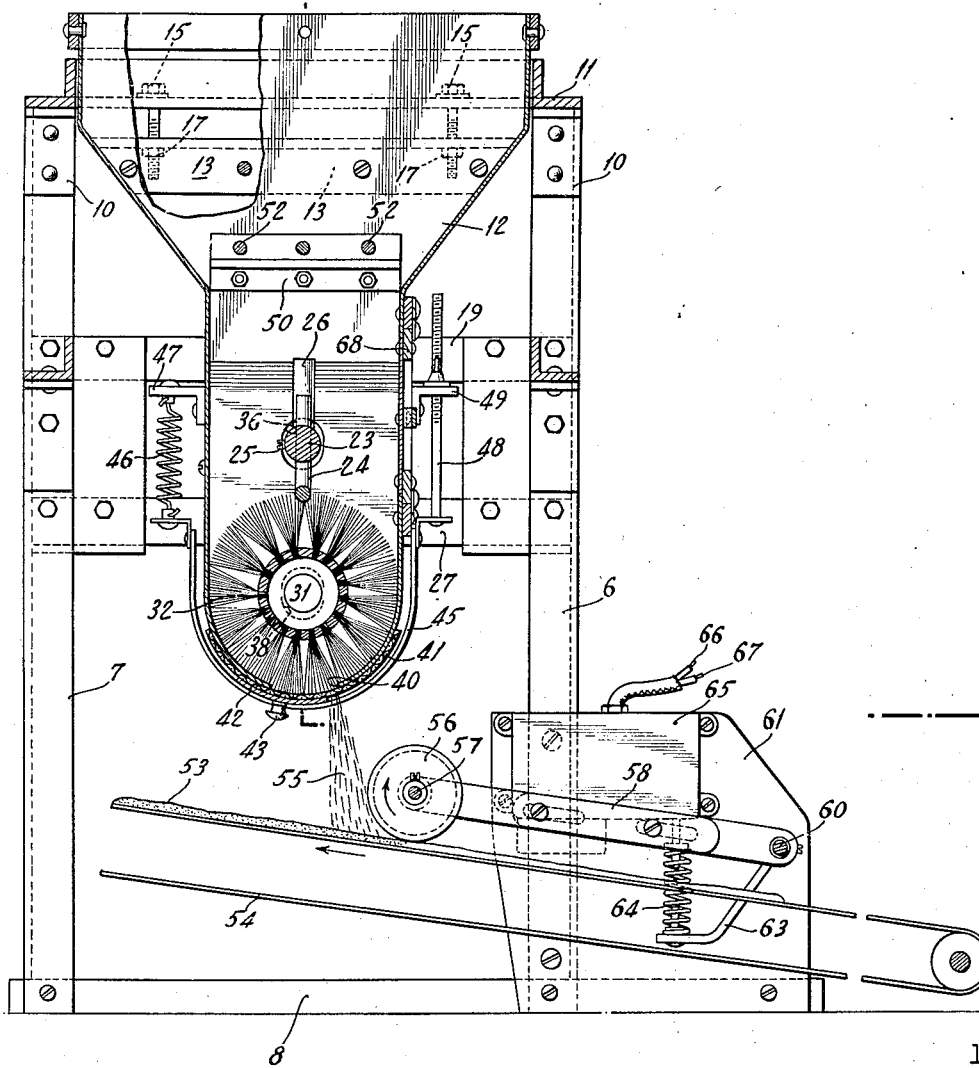

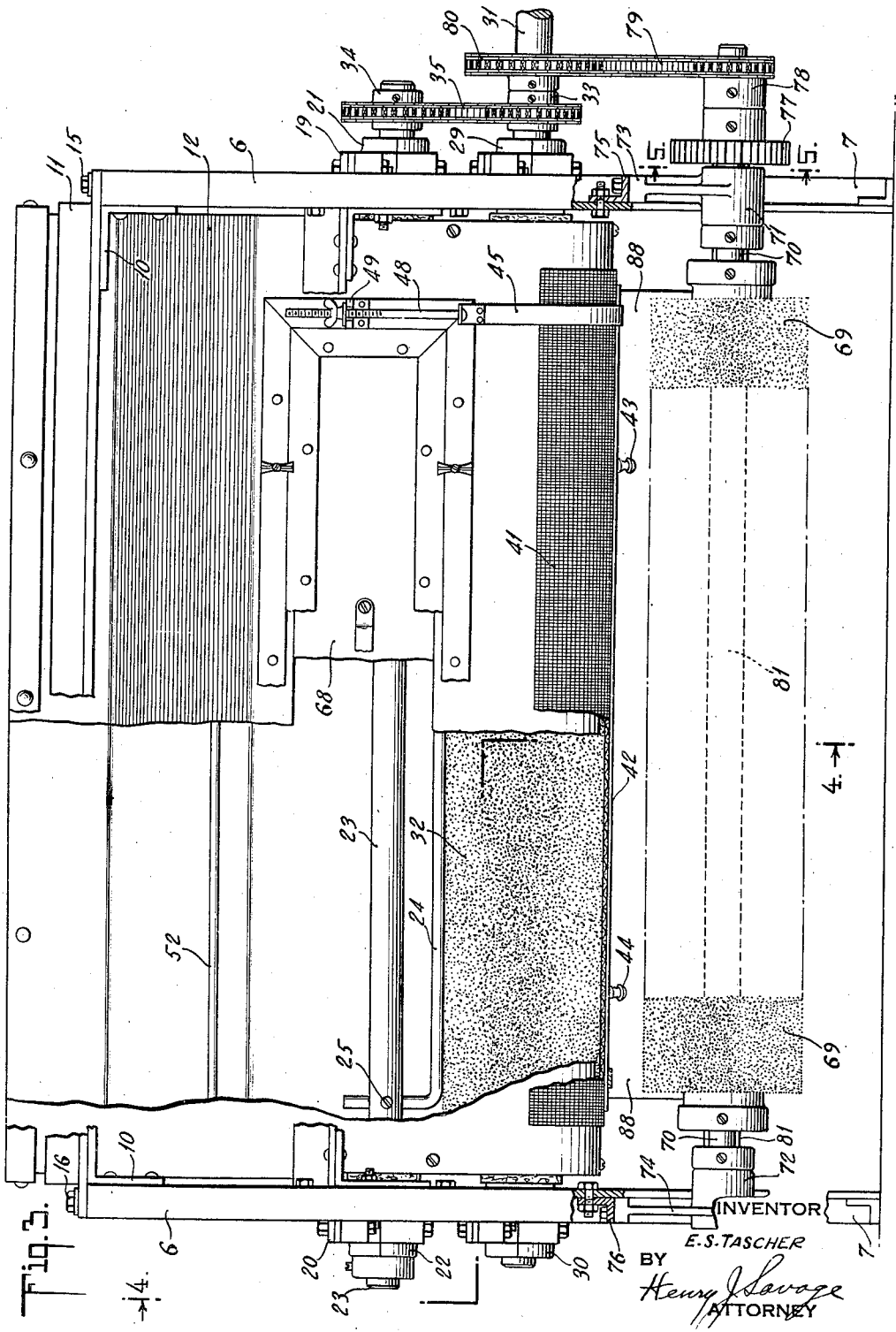

2,390,195

UNITED STATES PATENT OFFICE 2,390,195

FLOUR DUSTER

Eugene S. Tascher, Ingleside, Ill., assignor to National Biscuit Company, New York, N. Y., a corporation of New Jersey Application February 14, 1944, Serial No. 522,354

13 Claims. (Cl. 107—7)

My invention pertains to flour dusters and has for its principal object to provide a means for and a method of applying a uniform layer or film of flour, of any desired thickness or density, to a sheet of dough or to baking pans or bands.

Another object is to create a fog or cloud of flour over a moving pan or band so as to deposit a film of flour thereon of a uniform, yet almost infinitesimal, thickness.

Another object is to provide a new method of dusting flour on dough or baking pans or bands so that the depth or thickness and uniformity of distribution of the film of flour may be accurately controlled.

Still another object is to provide means in a flour duster whereby excess flour, that may be present in the fog or cloud for dusting the pans or bands, will be withdrawn and reclaimed, thereby preventing loss of flour and its accumulation on the apparatus.

When rolling or sheeting many kinds of dough, it is necessary to dust the surface to keep the dough from adhering to the feed rolls and to the cutters. Flour also is used to impart a desired surface coating or finish to some doughs. It is also customary in baking some doughs to dust the baking pans, after they have been greased, very lightly with flour to prevent sticking and give the desired bottom finish to the baked articles. Heretofore, the flour has been dusted on both the dough and pans by sifting it on. This has not been entirely satisfactory because the flour can not be applied uniformly from a sieve nor can it be applied in a sufficiently thin coating on the pans. Heretofore, in dusting pans, it has been the practice to sift a light coating of flour on them, then turn the pans on edge and jar them to shake off the excess and spread the remainder as uniformly as possible over the pan surface. While this produces good results, it involves considerable hand labor in handling the pans and wastes a large part of the flour. With modern ovens having endless bands or conveyors with fixed pans, there has not been any satisfactory way or means for dusting a thin uniform coating of flour on the band or pans, prior to my invention.

The present invention provides means for dusting flour on either dough, pans, or bands with absolute uniformity and of any desired thickness, even down to a substantially infinitesimal, almost invisible, film.

In the accompanying drawings, I have illustrated two adaptations of my invention wherein;

Fig. 1 is a front elevation, partly in section on the line 1—1 of Fig. 2, of a duster for dusting flour on a sheet of dough;

Fig. 2 is a cross section, taken substantially on the line 2—2 of Fig. 1;

Fig. 3 is a front elevation, partly in section, of a duster adapted to apply the flour in a fog or cloud to a pan or band;

Fig. 4 is a cross section, taken substantially on the line 4—4 of Fig. 3; and

Fig. 5 is a detail of a gear drive taken substantially on line 5—5 of Fig. 3.

As shown in Figs. 1 and 2 the frame of the machine comprises two front legs or standards 6 and two rear legs 7, preferably made from light angle iron secured to bases 8, 9, also made from similar angles. At their tops, the four legs are connected by brackets 10 to a rectangular frame 11 within which the sheet metal hopper 12 is adjustably supported. An angle bar 13, 14 is secured to each end of the hopper and the horizontal flange of each bar is tapped to receive adjusting screws 15, 16 which are rotatably supported in the horizontal flanges at the ends of the frame 11. The adjusting screws are secured in adjusted position by locknuts 17, 18.

Cross bars 19, 20 connect the legs 6, 7 at each end of the machine and provide supports for bearings 21, 22 for a shaft 23 that carries an adjustable agitator arm 24 that prevents bridging of the flour in the hopper. The ends of the arm 24 extend through the shaft and are secured in adjusted position by any suitable means, as by set screws 25. Inclined vanes 26 are secured to each end of shaft 23 adjacent the ends of the hopper to prevent the flour from packing at the ends and to feed it toward the center.

Another pair of cross bars 27, 28, below the bars 19, 20, support bearings 29, 30 for a shaft 31 that carries a cylindrical brush 32. The shaft 31 extends beyond the frame at one end where it is driven from any suitable source of power, as an electric motor and adjustable speed reduction gear, and has a sprocket 33 which drives a sprocket 34 on shaft 23 through a chain 35. The sprockets 33 and 34 differ slightly in size, as 24 teeth and 22 teeth, so that the agitator arm 24 will strike the rotating brush 32 at different places on successive rotations and not produce excessive wear at one point.

The hopper 12 is made from sheet metal and is adjustable vertically in the frame by means of the adjusting screws 15, 16. The bottom of the hopper is semi-cylindrical so as to fit approximately the contour of the rotating brush 32. In each end wall, there are elongated openings 36, 37, 38, 39 through which the shafts 23, 31 extend, so that the hopper may be adjusted with respect to the brush 32. A wide slot or port 40 in the bottom extends nearly the full length of brush 32 and is covered by a wire screen 41. The mesh of this screen and width of the slot may vary for different kinds of work, but I have found that a 22 mesh screen and a slot opening of ½ inch are satisfactory for most flour dusting operations. The slot and screen together form a foraminous bottom for the hopper, and a suitable perforated bottom could be used in their stead. An arcuate shutter 42 is slidable over the screen 41 to adjust the effective width of the slot 40 and the amount of flour that will pass through the screen. This shutter is manually adjustable by knobs 43, 44 and is yieldably held against the screen 41 by a strap 45 at each end. Each strap is connected at one end to a spring 46 secured to a bracket 47 on one side of the hopper and at the other end to an adjusting screw 48 passing through a bracket 49 on the other side of the hopper. By adjustment of the screws 48, the frictional resistance to movement of the shutter 42 over the screen 41 can be varied to suit operating conditions.

A cleat 50, 51 is secured to each end wall of the hopper and supports a grid or guard made from spaced parallel bars or rods 52 to prevent large objects or the arms of operators from contact with the agitator bar 24 and vanes 26.

The sheet of dough 53 that is to be dusted with flour is carried beneath the dusting brush 32, as by means of an endless belt 54, so that it receives a shower of flour through the slot 40. The thickness of the flour deposited on the dough is dependent upon several variables, all of which are accurately controlled. These variables include the speed of travel of the dough, the speed of the brush 32, the position of the shutter 42, and the position of the bottom of the hopper with respect to the rotating brush. By proper selection and co-ordination of these variables, the flour can be dusted on the dough in any desired thickness and will be applied uniformly over the dough. In Figs. 1 and 2, 55 indicates the flour being dusted on the dough sheet 53.

The sheet of dough 53 may be continuous or it may be in separate batches. When there is no dough on the belt 54 in position to be dusted, as when the sheet is discontinuous or the dough is in separate batches, it is desirable that no flour be discharged from the duster. To accomplish this and prevent wasting flour, I provide control means for the duster that is actuated by the sheet of dough to operate the duster when there is dough in position to be dusted and to stop the duster when there is no dough or when the sheet of dough is interrupted or disjoined.

This control means includes one or more rollers 56, of very light weight, secured to a light shaft 57 that is rotatably mounted in the inner ends of control arms 58, 59, that are adjustable as to length. The outer ends of the arms are fixed to a shaft 60 that is mounted to oscillate in plates 61, 62 secured to the bases 8, 9 and the lower ends of the front legs 6. At its end adjacent the plate 61, the shaft 60 has an arm 63 adapted through the yieldable connection 64 to actuate a spring toggle operated switch, within the switch box 65, in the circuit 66, 67 of a motor that drives the shaft 31 through a suitable variable speed reduction gear. I have not illustrated the switch because its details of construction are not part of the present invention and many commercial switches that are suitable for the purpose are available and well-known to engineers. The Mercoid control switch made by Detroit Lubricator Company operates satisfactorily.

When there is a sheet of dough 53 on the apron 54, it raises the rollers 56 and closes the switch in the box 64 which starts the motor that drives the shaft 31. When there is no dough on the apron 54, the rollers 56 rest on the apron and the switch is opened so that the motor does not run, the brush 32 does not rotate and no flour is dusted on to the apron. I have found a speed of 10 R. P. M. for the brush 32 to give satisfactory results and to spread the flour uniformly on the dough. Higher speeds can be used but they cause greater wear on the brush and shorten its useful life. Bristles will break from the brush 32 at times and pass through the screen 40 with the flour. For that reason, and also because of its longer life, I prefer to use a brush made from bristles of synthetic fibre, such as nylon, because I have found that such bristles disappear or evaporate during the baking period and leave no trace or effect on the baked articles.

A removable cover plate 68, extending the full length of the hopper 12, gives access to the interior for inspection, cleaning and adjustments.

The form of my invention illustrated in Figs. 1 and 2 is adapted particularly for dusting a relatively heavy coating of flour to a sheet of dough, while the form shown in Figs. 3 and 4, to which reference is now made, is adapted for dusting flour in a very thin film to pans and bands on which the dough is baked. In the two modifications, the frames and upper parts are alike and the same reference numbers are used to indicate like parts. The principal differences between the two embodiments are to be found below the dusting brush 32. In Figs. 3 and 4, the conveyor 54 and motor control mechanism are replaced by a band or conveyor for pans and a second dusting brush or fogging brush.

The brush 69 is secured to a shaft 70 mounted in bearings 71, 72 in brackets 73, 74 secured to cross bars 75, 76. The shaft 70 extends beyond the bearing 71 where it has a gear 77 and sprocket 78 secured to it. The sprocket 78 is driven by a chain 79 from a sprocket 80 on the drive shaft 31. The sprocket 80 is larger than sprocket 78, their ratio being 2 to 1 or larger, so that brush 69 rotates at a higher speed than brush 32. A rotatable dusting rod 81 is mounted at each end in adjustable bearings 82 in the brackets 73, 74 and at one end has a gear 83 meshing with the gear 77. As shown in Fig. 5, the ratio of these gears is 2 to 1 so that shaft 81 rotates at one half the speed of brush 69, but it may rotate at the same or a faster speed, and a definite ratio of speeds is not essential. The bearings 82, only one being illustrated, Fig. 4, are adjustable toward and away from the brush 69 by means of an adjusting screw 84 for each bearing. The bar 81 is adjustable so as to vary the contact with it of the bristles on the brush 69. The bar 81 is moved toward the brush until the contact of the bristles with it clouds or fogs the flour so as to cause a layer of the desired tenuousness to be deposited on the pans or bands. When the duster is inoperative, the screws 84 are turned to move the bar 81 out of contact with the brush so that the bristles, preferably nylon, will not take a permanent set by reason of their contact with the bar, should the machine remain idle for considerable time. As best shown in Fig. 5, the gears 77, 83 have only a few involute teeth of large pitch which permits the centers of the shafts 70, 81 to be separated far enough for shaft 81 to clear the brush 69 and yet the gears will remain in mesh.

In Fig. 4, 85 represents either a pan conveyor or an endless band which is to be dusted with flour. Its direction of travel relative to the direction of rotation of the brush 69 is indicated by the arrows, however, the conveyor or band may travel in the opposite direction. Usually, the lower part of the frame containing the brush 69 is open but it may be enclosed on two or more sides by sheet metal in case of a draft or air currents that would disturb the flour cloud. The brush 69, as its bristles snap off the shaft 81, produces a fog or cloud of flour which settles in a tenuous coating or deposit on the band or pans. A broad suction nozzle 88, leading to an exhaust fan 89, draws off excess flour from the cloud and prevents it from accumulating on the apparatus from which it might later drop in relatively large masses to the pans. The flour drawn off by the fan 89 is filtered out from the air and returned to the hopper so that none is lost.

In operation of the duster as shown in Figs. 3 and 4, the shutter 42 is adjusted so that the port or slit 40 is open only a small amount. The brush 32 scatters the flour passing through the port onto the brush 69 which rotates more rapidly. The bristles of the brush 69, carrying the finely divided flour, strike the rotating dusting rod 81 and as they leave it, snap forward thus scattering the flour in a fine fog or cloud above the slowly moving pans or band on which a tenuous layer of the flour settles and adheres since the pans or band are greased prior to dusting. All excess flour is drawn off by the fan 89.

The shaft 31 is driven through a variable speed drive so that the speed of the brushes may be varied within wide limits. The effective width of the port or slot 40 is adjusted by the shutter 42, and the clearance between the bottom of the hopper and brush 32 is adjustable. All of these adjustable features enable me to dust the flour to a very uniform thickness of any desired depth or weight down to a film or cloud of almost infinitesimal thickness, and to keep the rate of deposit constant as long as desired.

I have shown the lower end of the hopper 12 as semi-cylindrical so as to approximate the contour of the brush 32, but this lower end may be flat with proper width of port 40 and control shutter 42.

My invention is not limited to dusting flour on dough or pans, but may be used in other arts which require that finely divided material be coated uniformly over a given surface as in glazing paper, making abrasive sheets, and other articles.

The invention is of broad application and use and includes all such that come within the scope of my claims.

What I claim is:

1. In a machine of the class described, the combination of a frame, a hopper mounted on the frame and having an elongated opening in its bottom, a brush mounted on the frame to rotate in the hopper adjacent said opening, means for adjusting the width of said opening, and means for adjusting the hopper vertically with respect to the brush.

2. In a machine of the class described, the combination of a frame, a hopper mounted on the frame and having a foraminous bottom, a cylindrical brush mounted on the frame to rotate within the hopper adjacent the foraminous bottom, a shutter adjustable over the foraminous bottom to vary the effective area thereof, a shaft mounted on the frame to rotate within the hopper above the brush, and an agitator arm on said shaft adapted to contact said rotating brush.

3. In a machine of the class described, the combination of a frame, a hopper mounted on the frame and having a foraminous bottom, a brush mounted on the frame to rotate within the hopper adjacent the foraminous bottom, a shutter adjustable over the foraminous bottom to vary the effective area thereof, a shaft mounted on the frame to rotate within the hopper, an agitator arm on said shaft adapted to contact said rotating brush, and means for adjusting said hopper vertically with respect to said brush.

4. In a machine of the class described, the combination of a frame, a hopper adapted to hold flour mounted on the frame and having an elongated opening in its bottom, a brush mounted on the frame to rotate in the hopper adjacent said opening, means for adjusting the width of said opening, means for rotating said brush, a conveyor adapted to carry a sheet of dough beneath the opening in said hopper, and control means for said brush comprising a pivoted arm having means at one end to contact said conveyor or the sheet of dough thereon, said arm being connected to actuate said control means whereby the brush will be rotated to dust flour on the dough when the end of the arm is raised by dough on the conveyor and the brush will be stationary when the arm is not raised by the dough.

5. In a machine of the class described, the combination of a frame, a hopper adapted to hold flour mounted on the frame and having a foraminous bottom, a brush mounted on the frame to rotate within the hopper adjacent the foraminous bottom, a shutter adjustable over the foraminous bottom to vary the effective area thereof, a shaft mounted on the frame to rotate within the hopper, an agitator arm on said shaft adapted to contact said rotating brush, means for rotating said brush, a conveyor adapted to carry a sheet of dough beneath the opening in said hopper, and control means for said brush comprising a pivoted arm having means at one end to contact said conveyor or the sheet of dough thereon, said arm being connected to actuate said control means whereby the brush will be rotated to dust flour on the dough when the end of the arm is raised by dough on the conveyor and the brush will be stationary when the arm is not raised by the dough.

6. In a machine of the class described, the combination of a frame, a hopper mounted on the frame and having an elongated opening in its bottom, a brush mounted on the frame to rotate in the hopper adjacent said opening, means for adjusting the width of said opening, and a dusting brush mounted to rotate on the frame beneath the opening in said hopper.

7. In a machine of the class described, the combination of a frame, a hopper mounted on the frame and having an elongated opening in its bottom, a brush mounted on the frame to rotate in the hopper adjacent said opening, means for adjusting the width of said opening, a dusting brush mounted to rotate on the frame beneath the opening in said hopper, and means for rotating said dusting brush faster than the first mentioned brush.

8. In a machine of the class described, the combination of a frame, a hopper mounted on the frame and having an elongated opening in its bottom, a brush mounted on the frame to rotate in the hopper adjacent said opening, means for adjusting the width of said opening, a dusting brush mounted to rotate on the frame beneath the opening in said hopper, and a dusting rod mounted adjacent to said dusting brush in position to contact the brush on the downwardly rotating side.

9. In a machine of the class described, the combination of a frame, a hopper mounted on the frame and having an elongated opening in its bottom, a brush mounted on the frame to rotate in the hopper adjacent said opening, means for adjusting the width of said opening, a dusting brush mounted to rotate on the frame beneath the opening in said hopper, a dusting rod mounted adjacent to said dusting brush in position to contact the brush on the downwardly rotating side, and means for adjusting said dusting rod into and out of contact with said dusting brush.

10. In a machine of the class described, the combination of a frame, a hopper mounted on the frame and having an elongated opening in its bottom, a brush mounted on the frame to rotate in the hopper adjacent said opening, means for adjusting the width of said opening, a dusting brush mounted to rotate on the frame beneath the opening in said hopper, a dusting rod mounted to rotate adjacent said dusting brush, means for rotating said rod opposite to the rotation of the dusting brush, and means for adjusting said dusting rod into and out of contact with said dusting brush.

11. In a machine of the class described, the combination of a frame, a hopper mounted on the frame and having a foraminous bottom, a brush mounted on the frame to rotate within the hopper adjacent the foraminous bottom, a shutter adjustable over the foraminous bottom to vary the effective area thereof, a shaft mounted on the frame to rotate within the hopper, an agitator arm on said shaft adapted to contact said rotating brush, means for adjusting said hopper vertically with respect to said brush, a dusting brush mounted to rotate on the frame beneath the hopper, a dusting rod mounted to rotate adjacent said dusting brush, means for rotating said rod opposite to the rotation of the dusting brush, and means for adjusting said dusting rod into and out of contact with said dusting brush.

12. In a machine of the class described, the combination of a frame, a hopper mounted on the frame and having a foraminous bottom, a brush mounted on the frame to rotate within the hopper adjacent the foraminous bottom, a shutter adjustable over the foraminous bottom to vary the effective area thereof, a shaft mounted on the frame to rotate within the hopper, an agitator arm on said shaft adapted to contact said rotating brush, means for adjusting said hopper vertically with respect to said brush, a dusting brush mounted to rotate on the frame beneath the hopper, a dusting rod mounted to rotate adjacent said dusting brush, means for rotating said rod opposite to the rotation of the dusting brush, means for adjusting said dusting rod into and out of contact with said dusting brush, whereby finely divided material discharged from said hopper to said dusting brush will be thrown from the latter in a cloud, and an exhaust conduit having its inlet adjacent said dusting brush to draw off excess clouded material.

13. In a machine of the class described, the combination of a hopper for finely divided material having an elongated opening in its bottom, means for adjusting the width of the opening, a dusting brush mounted to rotate on a horizontal axis beneath the opening and receive material passing therethrough, a dusting rod mounted adjacent the rotating brush in position to contact the brush on its downwardly rotating side, whereby the finely divided material will be discharged from said brush in a cloud, and an exhaust conduit for drawing off excess clouded material.

EUGENE S. TASCHER.